(12) United States Patent
Kilian-Kehr et al.

(10) Patent No.: US 7,904,111 B2
(45) Date of Patent: *Mar. 8, 2011

(54) MOBILE EXCHANGE INFRASTRUCTURE

(75) Inventors: Roger Kilian-Kehr, Darmstadt (DE);
Jochen Haller, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 318 days.

This patent is subject to a terminal disclaimer.

(21) Appl. No.: 12/049,576

(22) Filed: Mar. 17, 2008

(65) Prior Publication Data

US 2008/0215706 A1    Sep. 4, 2008

Related U.S. Application Data

(63) Continuation of application No. 10/900,275, filed on Jul. 28, 2004, now Pat. No. 7,392,060.

(51) Int. Cl.
*H04M 1/00* (2006.01)
(52) U.S. Cl. .................. 455/552.1; 455/556.1; 455/557
(58) Field of Classification Search ........... 455/552.1, 455/556.1, 557; 709/229
See application file for complete search history.

(56) References Cited

U.S. PATENT DOCUMENTS 6,961,776 B1   11/2005  Buckingham et al.
2004/0215760 A1   10/2004  Bergeot et al.

*Primary Examiner* — Temica M Beamer
(74) *Attorney, Agent, or Firm* — Fish & Richardson P.C.

(57) ABSTRACT

A mobile exchange infrastructure, in which a request to invoke functionality provided by a first of two services is accessed. If the request is incompatible with the first service, the accessed request is affected. The functionality is invoked using the affected request.

18 Claims, 4 Drawing Sheets

MOBILE EXCHANGE INFRASTRUCTURE

CROSS REFERENCE TO RELATED APPLICATIONS

This application is a continuation of U.S. patent application Ser. No. 10/900,275, filed Jul. 28, 2004, which is incorporated herein by reference.

TECHNICAL FIELD

This description relates to mobile computing.

BACKGROUND

Computer applications are typically written to perform some defined, desired function. For example, computer applications exist for word processing, appointment scheduling, electronic mail, and Internet browsing. More specifically, business applications exist that are designed to perform or automate business functions, such as, for example, customer relationship management or supply chain management.

Although such computer applications may each be written from the ground up, it has been found that applications may better be created or implemented by utilizing pre-existing applications, or portions thereof. For example, the Common Object Request Broker Architecture (CORBA) is an architecture that allows portions of applications known as objects to work together, even when the objects are written in different programming languages or are running on different operating systems. As a result, a programmer or other user of an application may gain access to, and use of, the data and functionality of many other applications.

In many situations, however, it is desirable to provide a user with access to an application's functionality, without necessarily exposing all of the data associated with the application. Moreover, it may be desirable to do so in a manner that requires little or no programming knowledge on the part of the user, and that minimizes computing resources required by the user.

In order to provide these and other uses and advantages, "application services," or "services," have been developed. For example, "Web services" are deployed over the Internet that are designed to provide a specific functionality to a user. For example, a developer of a website may wish to provide a stock quotation service on the website, or a travel reservation/confirmation function. Such functionality may be added to the website simply by providing access to pre-existing services, even though such services may be running behind a firewall and may themselves have access to data that must be inaccessible to users of the website (e.g., travel information of other users).

SUMMARY

According to one general aspect, a system includes a user application operable to provide functionality to a user of a mobile device, a first application service that is implemented separately from the user application and that is operable to enable a first aspect of the functionality, and a mediation interface deployed on the mobile device and operable to provide mediation between the user application and the first application service, such that the user application is able to implement the first aspect of the functionality, based on the mediation.

Implementations may include one or more of the following features. For example, the system may include a second application service that may be implemented separately from the user application and that may be operable to enable a second aspect of the functionality. In this case, the mediation interface may be operable to mediate between the first application service and the second application service, such that data obtained by the first application service for providing the first aspect of the functionality is available to the second application service for providing the second aspect of the functionality. Further, the first application service may be deployed on the mobile device, and the second application service may not be deployed on the mobile device.

The system may include a second application service that may be implemented separately from the user application and that may be operable to interact with the first application service to provide the first aspect of the functionality, and the mediation interface may be operable to mediate between the first application service and the second application service. The first application service may be deployed on the mobile device.

The mediation interface may include a translator operable to translate between a first messaging protocol used by the user application and a second messaging protocol used by the first application service. The mediation interface may include an adaptor operable to convert a first type of procedure call from the user application into a format that is compatible with a second type of procedure call recognized by the first application service for invoking a procedure of the first application service, where the procedure may be requested by the user application as part of the first aspect of the functionality.

The mediation interface may include an emulator operable to enable instantiation of the first application service. In this case, the first application service may be associated with a first application framework, and the emulator may be deployed on the mobile device and associated with a second application framework. Further, the emulator may enable instantiation of the first application service using the second application framework.

According to another general aspect, a request is received from a user application for a first functionality, where the user application is deployed on a mobile device. A first service is determined that is operable to enable the first functionality within the user application, the request is modified based on interface characteristics of the first service to obtain a modified request, and the first functionality is invoked using the modified request.

Implementations may include one or more of the following features. For example, data obtained by the invoking of the first functionality with a second service may be shared, where the second service may be operable to enable a second functionality within the user application.

In invoking the first functionality, a service request may be forwarded to a second service on behalf of the first service, where the second service may be operable to enable a second functionality within the user application. In determining the first service, it may be determined that the first service is deployed on the mobile device.

Also in determining the first service, it may be determined that the first service is not running, a first bytecode associated with a first framework of the first service may be converted into a second bytecode associated with a second framework associated with the mobile device, and the first service may be run using the second bytecode.

In modifying the request, a first messaging protocol used in the request may be translated into a second messaging protocol in the modified request that is interoperable with the first service. In modifying the request, a first method invocation contained within the request may be adapted into a second method invocation within the modified request that is interoperable with the first service.

According to another general aspect, a system includes a plurality of mobile devices, and each of the mobile devices includes an application layer on which a user application runs, a service layer on which a service runs, and a mediation layer embedded on the service layer and providing a first interface between the service and the user application.

Implementations may include one or more of the following features. For example, the mediation layer may provide a second interface between the service layer and another service of another one of the mobile devices, or a second interface between the service layer and an operating system of the mobile device, or a second interface between the service layer and an application framework layer on which the service and the application run.

The mediation layer may be operable to modify communications between the user application and the service to ensure interoperability therebetween, based on characteristics of the user application. The mediation layer may be operable to modify communications between the user application and the service to ensure interoperability therebetween, based on characteristics of the service. The mediation layer may be operable to modify communications between the service and another service running on another one of the mobile devices, to ensure interoperability therebetween, based on characteristics of one or both of the services.

The details of one or more implementations are set forth in the accompanying drawings and the description below. Other features will be apparent from the description and drawings, and from the claims.

DETAILED DESCRIPTION

Figure 1:
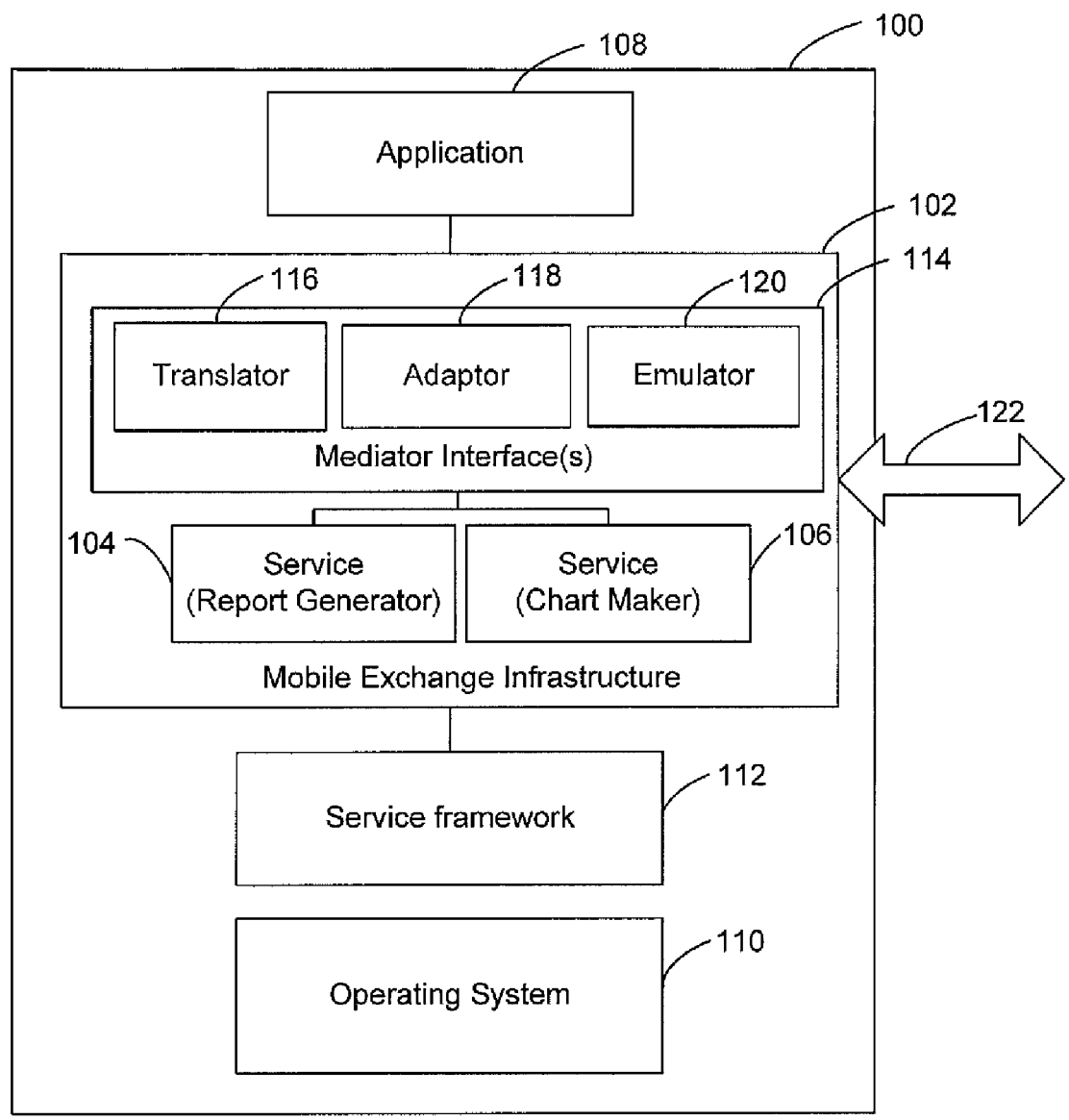
FIG. 1 is a block diagram of a mobile computing device having a mobile exchange infrastructure.

FIG. 1 is a block diagram of a mobile computing device 100 having a mobile exchange infrastructure 102. The mobile exchange infrastructure 102 provides mediation to account for different standards and methods that exist with respect to the creation and use of services, such as, for example, a first service 104 and a second service 106.

On the mobile computing device 100, the mobile exchange infrastructure 102, services 104 and 106, and an application 108 are all assumed to run on an operating system 110. The mobile device 100 may be, for example, a Personal Digital Assistant (PDA) or Smartphone of an enterprise employee who has been assigned to complete some task, perhaps at a site of an enterprise partner or customer.

The application 108 may be, for example, a Customer Relationship Management (CRM) application. The services 104 and 106 may be, for example, a report generator and a chart maker, respectively. In this way, the user of the mobile device 100 at a customer site may, for example, use the application 108 to create a chart illustrating recent orders of the customer, and may subsequently or concurrently use the application 108 to generate a report on those orders.

As described above, the use of services 104 and 106 by the application 108 allows for minimal size and resource usage of the application 108, as compared to a scenario in which report generation and chart making functionalities are built into the application 108 itself. Also, other applications on the mobile device 100 also may use the services 104 and 106, thereby improving an efficiency of the mobile device 100. Moreover, as discussed in more detail below, applications and services on other mobile devices may make use of the services 104 and 106, assuming those devices are networked (or otherwise connected) to the mobile device 100.

The services 104 and 106 may be implemented using the Extensible Mark-up Language (XML), which provides a universal syntax for data description/structure that does not rely on any particular application logic. More specifically, the services 104 and 106 may be written using virtually any programming language, such as, for example, the Java programming language. Then, the services 104 and 106 each may be provided with an interface(s) that is designed to provide information from the, in this case, Java program, as an XML document to be used/accessed by the application 108.

Thus, the service 104 (which is discussed below by way of example, although it should be understood that similar comments may apply to the service 106), generally may release information as an XML document, and the application 108 seeks to extract and use the information from this XML document. In the examples discussed herein, the application 108 is generally discussed as a business application, such as the CRM application referred to above. However, it should be understood that the application 108 may be many other types of applications, such as, for example, a Microsoft Windows application, a web page, a wireless mark-up language (WML) for mobile phones, or a Palm/Win CE application for PDAs.

A manner in which the interface(s) of the service 104 are defined and described may be encapsulated in a document associated with the service 104. For example, the Web Services Description Language (WSDL) is a language used to describe interfaces or other characteristics of the service 104 in an XML document. That is, WSDL is intended to enable a user to build an application capable of talking to the service 104. Although examples below may refer to service(s) using such a WSDL service interface, particularly in the context of web services, it should be understood that such web services may use other standards to expose their interface(s), or may use a proprietary interface, as well. In such cases, the mediation layer 102 may be used to provide seamless communication between the, for example, WSDL interface and the other interface (e.g., proprietary interface), perhaps using a proprietary adaptor or plug-in associated with the other interface.

As referred to above, the service 104 need not be deployed at the mobile device 100, but may be running at a remote site that is accessed, for example, using a computer network. As a result, it is useful to have techniques for locating a desired service over the network. For example, the Universal Description, Discovery, and Integration (UDDI) specification is a specification used to describe a service, as well as how to discover the service and/or interact with it over the network. For example, a registry of services may be provided using UDDI, so that an application can search for, find, and use a desired service if it exists on the network.

One characteristic of the service 104 relates to how it transports XML information or documents to the application 108, particularly over a network. That is, a particular messaging protocol is typically used that is designed to ensure that the application 108 correctly receives and interprets XML information from the service 104, and that ensures that requests or invocations from the application 108 are correctly routed to the service 104 or portions thereof.

For example, the service 104 may be written in Java, and may include Java processing components such as Enterprise Java Beans (EJBs). The service 104 may include a first EJB for generating a first type of report, and a second EJB for generating a second type of report. The application 108 may send a request to the service 104 that requires the first type of report, so that the request must be correctly routed to both the service 104 itself, as well as to the correct (first) EJB within the service 104.

In order to transport the request from the application 108 to the service 104 (and vice-versa), it may be possible simply to use a standard transport protocol, such as, for example, the Hyper-Text Transfer Protocol (HTTP) or the Simple Message Transfer Protocol (SMTP). These protocols may be well-suited for such query-response interactions, since such interactions often may mimic the client-server interactions for which HTTP and SMTP were designed.

In order to actually invoke a desired method or function of the service 104 (e.g., the first EJB in the example above), more detailed and application/service-specific protocols may be desired or required in order for the application to correctly utilize the interface(s) of the service 104 and to invoke its specific methods or functions. In some applications, it becomes difficult or impractical simply to send the XML interface documents over, for example, HTTP. Moreover, using XML over HTTP in the manner just described may result in services that are overly specific to particular applications or operating systems, so that such services are not easily accessed by other applications.

Simple Object Access Protocol (SOAP) is a particular messaging protocol that was developed to encode XML information in a service request or response message. SOAP messages are intended to be independent of any particular operating system and may be transported by various protocols including, for example, HTTP or SMTP. SOAP may be instrumental, for example, when more than one technique exists for obtaining information from the service 104, since SOAP may be able to automate the various techniques. In one implementation, then, SOAP provides support for XML document exchange by defining an XML message format for exposing business objects (e.g., Javabeans) to SOAP calls, and by executing remote function calls on those objects to thereby invoke the associated service(s) and functionality.

In one implementation, SOAP provides an encoder that embeds an XML message from an application in a SOAP envelope, and that may include metadata about the XML message (e.g., processing instructions). Then, when the service 104 receives the SOAP message, a SOAP decoder may be used to "unwrap" the message and route the underlying XML message appropriately.

SOAP clients have been created for numerous platforms and developmental environments, including, for example, programming languages Java, Perl, and C++. One particular development environment for which SOAP clients have been developed is the .NET environment developed by Microsoft.

.NET is designed to facilitate building, hosting, and deploying Web services and the applications that access them, and is typically embedded into products of the Microsoft platform. Although .NET has many similarities in function to other service development techniques, there may nonetheless be differences in the implementation of these functions. For example, where UDDI may be used with WSDL documents as described above, .NET may use other discovery techniques for performing the function of the UDDI specification.

In the context of FIG. 1, .NET provides a service framework 112 that facilitates construction and use of the service 104 (and/or the service 106). As discussed below, other examples of the framework 112 also may be used, for other platforms or development environments.

In consideration of the above and other issues, and as referred to above, the mobile exchange infrastructure 102 is used to facilitate interoperability of the services 104 and 106 with the application 108 and with one another, and with other applications and services that may or may not be deployed on the mobile device 100. For example, the mobile exchange infrastructure 102 may mediate between the service 104, which may be using XML over HTTP, and the application 108, which may be using some form of SOAP. As another example, the mobile exchange infrastructure 102 may mediate between a SOAP client developed for one environment (e.g., .NET) and a SOAP service operating in a different environment (e.g., Java). Similarly, the mobile exchange infrastructure 102 may mediate between the application 108, which may be expecting a WSDL compatible service, and the service 104 implemented as a .NET service.

Such an ability to mediate between applications and services, and between services, may be particularly advantageous in a mobile environment of the device 100, in which computing power and resources are at a premium compared to, for example, corporate back-end systems. For example, the mobile device may only be able to store and use a limited number of applications and/or services. As a result, greater efficiency may be achieved by increasing interoperability between the applications and services, even between multiple ones of the mobile devices 100.

The mobile exchange infrastructure 102 includes a plurality of mediator interfaces 114 that are designed to facilitate interoperability between the application 108, the service 104, the service 106, and other applications and services not deployed on the mobile device 100. Although several examples of the mediator interfaces 114 are discussed below, it should be understood that variations on the example interfaces also may be implemented, and other mediator interfaces, not explicitly described herein, may be used as well.

A translator 116 is designed to translate between different messaging protocols that may be used by the application 108, with respect to the services 104 and 106 (or other services). For example, if the application 108 uses XML over HTTP, the translator 116 may translate a message from the application to a specific type of SOAP message used by the service 104, and vice-versa for messages from the service 104 to the application 108.

In some implementations, all messages from the application 108 to the services 104 and 106 are required to pass through the mediator interfaces 114, even if such mediation is not necessary for the communication at hand. For example, in the scenario just described, the service 106 may utilize XML over HTTP, and may not require mediation from the mobile exchange infrastructure 102 to communicate with the application 108.

Nonetheless, by passing communications between the application 108 and the service 106 through the mediator interfaces 114, such communications may be made available for use by the service 104, should such use be required. For example, in the examples above in which the service 104 is a report generator and the service 106 is a chart maker, the application 108 may construct several charts using the service 106. If the user of the mobile device 100 then wishes to generate a report using the service 104, the user may do so, since the information used in constructing the charts has been made available to the report generator service 104 by way of the mobile exchange infrastructure 102 and its mediator interfaces 114.

Although the translator 116 functions at a level of the messaging protocols used by applications and services, the mediator interfaces 114 also may facilitate interaction between applications and services at a level below the messaging protocols; e.g., at a level of the content of the messages (regardless of the protocol used). For example, a message from the application 108 may be intended to invoke a method of the service 104, or a message from the service 104 may be used to invoke a method of the service 106.

When performing such a method invocation or other procedure call, differences in the development environments of the applications and/or services may result in difficulties in implementing the method or procedure. For example, if the service 104 as a .NET service passes a result to the service 106 as a Java service, an interface to the (Java) service 106 would typically specify methods which may be invoked by the (.NET) service 104 via a SOAP message, and can subsequently pass result data back to the service 104.

Although such an exchange may be completely operable in some instances, depending on how well the service interfaces are specified, it is also true that, in practical cases, incompatibilities exist between various known interface and service types. An adaptor 118 is provided within the mediator interfaces 114 to take these incompatibilities into account, and to ensure that the service interface for the Java service 106 correctly passes the method invocation to the Java service 106.

For example, the adaptor 118 may be provided as a .NET-Java adaptor that is designed to take into account known glitches or problems that may occur between these two development environments. In this way, the adaptor 118 is able to automatically point an invocation from the .NET service 104 to a correct format or method for use by the Java service 106.

In this case, all communications between the services 104 and 106 would be passed through the adaptor 118 of the mediator interfaces 114. In other cases, a separate adaptor could be used for correcting method invocation within (SOAP) calls, and for otherwise mediating between services. For example, a version of the adaptor 118 may be implemented to connect the .NET service 104 to, for example, a Perl-based service.

In one implementation, the adaptor 118 is implemented as a modular solution in which different, environment-specific adaptors are plugged into application frameworks. For example, a .NET adaptor may be used to mediate between a .NET service and all other service types, while a Java adaptor may similarly be used to mediate between a Java service(s) and all other types of services.

The above examples refer to the implicit semantics involved in matching invocations between different services, so as to, for example, alter parser requests from a first service type as needed for understanding and use thereof by a second service type when such an invocation would not otherwise match the second service type. In one implementation, a domain ontology may be used to meet these requirements, as well.

For example, the mobile device 100 may represent different types of mobile devices running different business applications that may belong to different users, who, in turn, may be employed by different companies. When business applications need to communicate in such circumstances (for instance, via web services), the users will generally need to authenticate. One conventional technique for such authentication involves using client certificates (e.g., X.509). In such certificates, certain properties are bound to the user, for example, the user's name may be contained within a "holder field." Accordingly, one company may bind user names in the order: "surname, first name," while the other company may order user names in the order: "first name, surname."

In this case, the applications of both users would need to be aware of such semantic issues in order to validate the certificate(s). Of course, there also may be other mappings of domain-specific properties, for example, on a business data or content level. Although static mapping of such properties is possible, and perhaps optimal, depending on the circumstances, it is also possible to implement an adaptable and extendable domain ontology, which refers to a software entity that is semantically aware of such specific cross-domain issues as the examples just given, and that is operable to provide a translation between domains to account for these issues during run-time.

In the discussions above, it is assumed that both services 104 and 106, as well as any accessed services that are external to the mobile device 100, are already running or instantiated during a time of their interaction with the mobile exchange infrastructure 102. In some cases, however, a service may not be running or instantiated when its functionality is requested. An emulator 120 may then be used to emulate the service for interoperability with the requesting application/service, and thereby provide access to the requested service.

More specifically, such mediation should be understood to exist between the services (e.g., 104, 106) and the framework (s) that support the services, if any (e.g., the framework 112). For example, a situation may exist where the application 108 is instructed to access a service that exists on another mobile device (not shown, but assumed for simplicity and for example to have essentially the same construction as the mobile device 100), where the mobile exchange infrastructure 102 may access the other device using a communications interface 122. In this case, the accessed service may be a Java service, and an associated framework (analogous to the framework 112 of the mobile device 100) may be a Java framework.

If the requested service is not currently running or instantiated, then the emulator 120 may, in one implementation, simply attempt to run the requested service. In the case where the framework 112 also is a Java framework (i.e., is compatible with the analogous framework), then the requested service may be able to run in a straightforward manner. In a related example, the emulator 120 may run the requested service by emulating execution of the byte code of the requested service, where the bytecode is compiled from Java source code to serve as a cross-platform intermediary between the Java source code and machine language. Such bytecode is typically interpreted by a Java Runtime Environment (JRE) and executed at runtime within a Java Virtual Machine (VM) (e.g., for using the EJBs referred to above). By emulating execution of the bytecode in this manner, a dynamic installation of such a Java VM at the mobile device 100 may be avoided.

In other situations, however, the above-described scenarios may not be applicable. For example, the analogous framework on the secondary mobile device may be a .NET framework. If the services 104 and 106 are Java services, and the framework 112 is a Java framework, then the emulator 120 may be used as a full bytecode converter that operates to translate between the .NET bytecode and the Java bytecode, so that the requested service may run on the mobile device 100.

More specifically, in the .NET environment, the Common Language Runtime (CLR) is analogous to the Java VM in that it allows execution of a particular service, and acts as an intermediary between the source language(s) and machine language. In CLR, source code is translated into Microsoft Intermediate Language (MSIL), which is analogous to Java bytecode. The Java bytecode of the requested service may be converted to CLR bytecode (i.e., MSIL) by the emulator 120, as just described.

As illustrated by the examples above, the emulator 120 allows the application 108 and the services 104, 106 to access services that may not be currently running or instantiated, even when such services may be implemented on a different platform or framework than the requesting application/service. Although the above examples were given with respect to .NET and Java, and were discussed with respect to multiple devices, it should be understood that other development environments may be used, and that the emulator 120 may be implemented even with respect to intra-device services (for example, where both a .NET and a Java framework exist on the same device).

Figure 2:
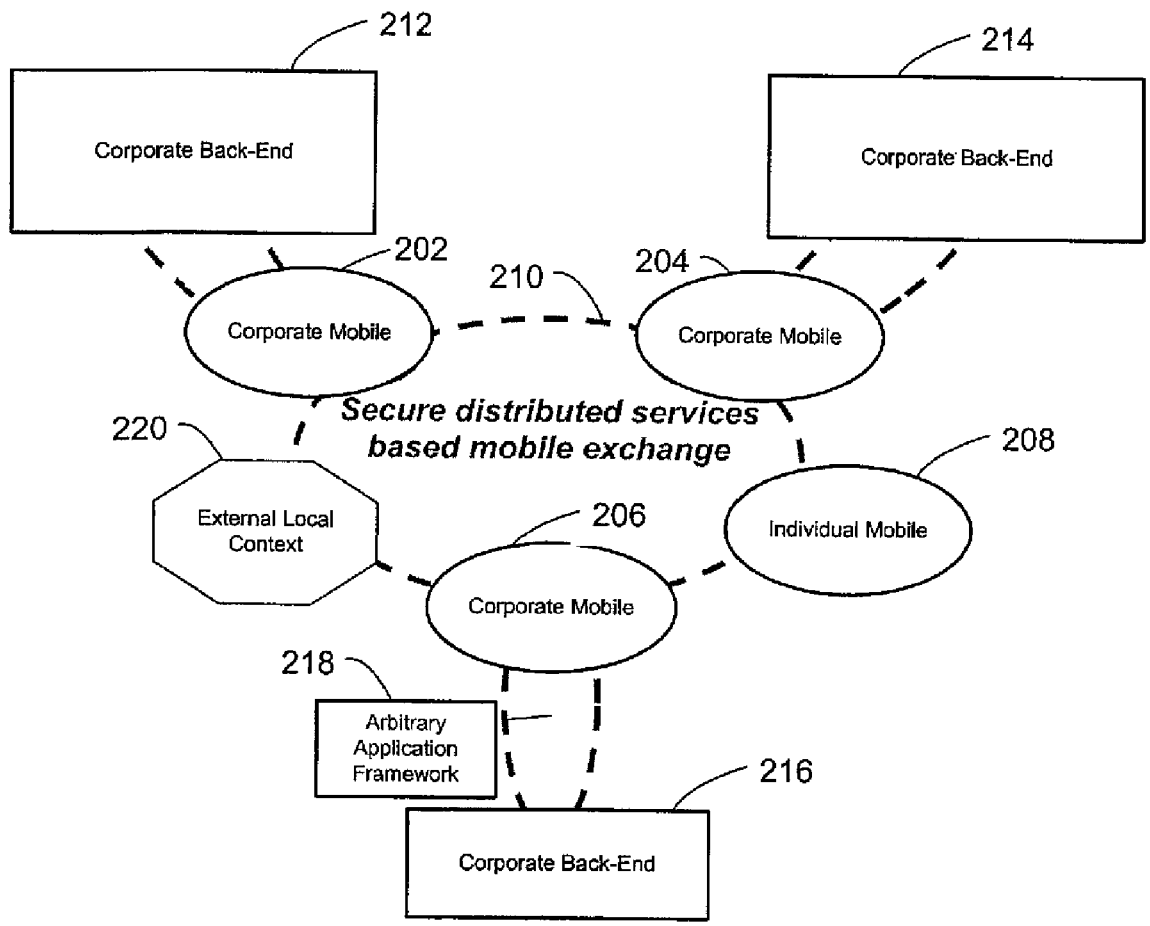
FIG. 2 is a block diagram of a use scenario for the mobile device of FIG. 1.

FIG. 2 is a block diagram of a use scenario for the mobile device of FIG. 1. In FIG. 2, mobile devices 202, 204, 206, and 208 may represent the mobile device 100, or variations thereof. All of the mobile devices 202, 204, 206, and 208 are connected to one another by way of a mobile exchange 210, which is analogous to the mobile exchange infrastructure 102 of FIG. 1. In this way, the devices 202, 204, 206, and 208 form a peer-to-peer network in which services running or existing on any one of the devices may be shared between and among all the other ones of the devices.

The mobile devices 202, 204, and 206 represent mobile devices of corporate employees who are constantly or intermittently in communication with their respective back-end corporate environments 212, 214, and 216. Of these, the device 206 and its back-end environment 216 share an application framework 218 that is analogous to the framework 112 of FIG. 1.

Also in FIG. 2, external local context information 220 refers to information about an environment into which the various mobile devices may enter. For example, from a physical standpoint, the device 206 may enter a new location as its user moves about and performs his or her tasks. In this case, the context information 220 may refer to location information that detects the presence of the user and configures access to the various services accordingly. For example, the user may have access to some services only when in a trusted/secure environment, and may be restricted from services when in a non-secure environment. From a network standpoint, the context information may detect that new services have been added and/or that other services have been removed.

Based on FIG. 1 and FIG. 2, it should be understood that the mobile exchange infrastructure 102 may be implemented as a feature that is homogenously-distributed on each device in the network. Although a particular mobile device may be configured with additional resources in terms of, for example, servers or services deployed thereon, it should be understood that no central service or exchange is necessary, and it is not necessary to pre-configure communication paths between the services.

Rather, the mobile exchange infrastructure 102 may be uniformly deployed on each mobile device, and services may communicate with applications, and with services on other devices, on an as-needed basis. As a result, an efficiency and use of each of the mobile devices, and thereby of their respective users, may be increased. For example, each mobile device may require relatively less in terms of computational resources, and may nonetheless be able to load and use a greater number and type of applications, since the mobile device may effectively use the resources and services available on the remaining mobile devices.

Figure 3:
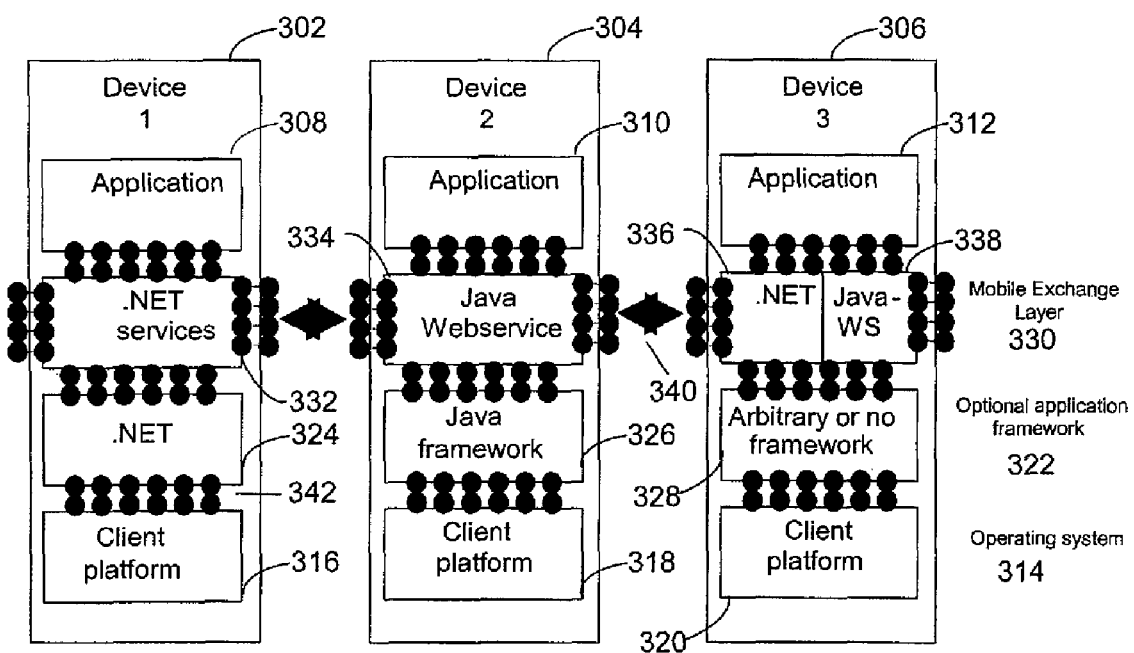
FIG. 3 is a block diagram illustrating interfaces between and within examples of the mobile device of FIG. 1.

FIG. 3 is a block diagram illustrating interfaces between and within examples of the mobile device of FIG. 1. In FIG. 3, a first device 302 interacts with a second device 304, and both of these interact with a third device 306. The devices 302, 304, and 306 are shown as implementing a layered version of the mobile device 100 of FIG. 1, as discussed in more detail below.

The devices 302, 304, and 306 run applications 308, 310, and 312, respectively. As already described, each of these applications may expect or require a particular interface or type of interface for interacting with services. Further, the applications 308, 310, and 312 are running on an operating system layer 314 that includes respective operating systems or client platforms 316, 318, and 320.

An application framework layer 322 is generally analogous to the framework 112 of FIG. 1, and includes a .NET framework 324, a Java framework 326, and an arbitrary (or no) framework 328.

A mobile exchange layer 330 is an example of the mobile exchange infrastructure 102 of FIG. 1, and includes some or all of the mediator interfaces 114, as discussed in more detail below. The mobile exchange layer 330 includes various services deployed on and among the devices 302, 304, and 308. For example, the device 302 includes a .NET service 332, the device 304 includes a Java service 334, and the device 306 includes both a .NET service 336 and a Java service 338.

Horizontal interfaces 340 refer to those interfaces that facilitate communications between services. The horizontal interfaces 340 may include, for example, the translator 116 and/or the adaptor 118 of FIG. 1. As already explained, such interfaces are not part of any particular service, and do not generally require modification of the services. Rather, the interfaces are embedded at the mobile exchange layer 330, and mediate or facilitate communications between the services (and thereby between the applications 302, 304, and 306) in, for example, the manner described above with respect to FIG. 1.

Vertical interfaces 342 refer to interfaces between the services and the various underlying application frameworks at the framework layer 322, as well as to the interfaces between the services at the mobile exchange layer 330 and the applications 302, 304, and 306.

On example of such a vertical interface may be the emulator 120 of FIG. 1. For example, if the framework 328 is a Java framework, and the Java service 338 requests the Java service 334 when the latter service is not currently running or instantiated, then the vertical interfaces 342 may be used in running the Java service (since the Java framework 326 exists on the device 304).

However, if the .NET service 332 requests the Java service 334 when the latter service is not running or instantiated, then the emulator 120 on the mobile exchange layer of the device 302 may implement a bytecode conversion from the Java VM of the Java framework 326 to the CLR framework of the .NET framework 324, whereby the .NET service 332 (and potentially the application 308) may utilize the resources and functionality of the Java service 334.

Figure 4:
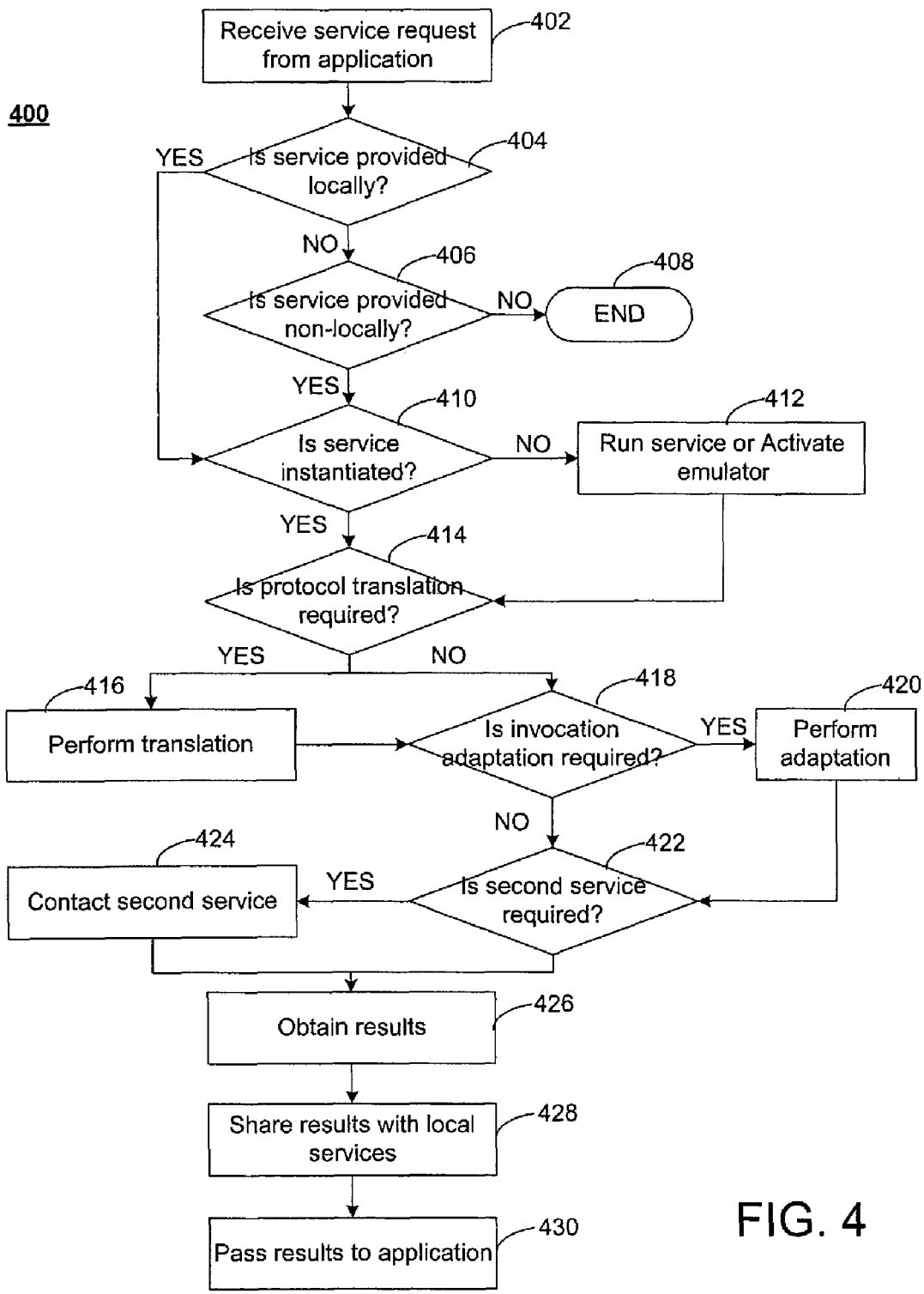
FIG. 4 is a flowchart illustrating a usage scenario of the mobile device of FIG. 1.

FIG. 4 is a flowchart 400 illustrating a usage scenario of the mobile device 100 of FIG. 1. In FIG. 4, the mobile exchange infrastructure 102 (e.g., the mobile exchange layer 330 of FIG. 3) receives a service request from an application (402). If the service is not provided locally (404), then the mobile exchange infrastructure 102 checks to determine whether it is provided non-locally (406). For example, the mobile exchange infrastructure 102 may perform a search for a particular service or type of service using UDDI or some other registration or discovery system. If the service is not provided non-locally, then the process would typically end (408).

Whether the service is local or non-local, the mobile exchange infrastructure 102 next determines whether the service is running or instantiated (410). If not, then the emulator 120 may be used to convert the bytecode of the service (412). Or, as mentioned above, in some cases if may be possible simply to run the service, e.g., where the requested service uses the same or similar framework as the requesting device 100.

Once the service is instantiated or otherwise running, a determination is made as to whether protocol translation is required (414), e.g., whether the translator 116 is needed to translate a service request from XML over HTTP to SOAP, or vice versa. If so, the translation is performed (416).

If translation is not required, or once it is performed, then the mobile exchange infrastructure 102 may determine whether adaptation is required for correcting/modifying the method invocations received within the service request message(s) (418). For example, the adaptor 118 of FIG. 1 may be implemented to determine that a request from an application (or service) expecting a .NET service may, in fact, be routed to a Java service. In this case, the adaptor 118 may inspect the various methods which the .NET request is seeking to invoke within the Java service, and modify the requests as needed. Accordingly, the adaptation may be performed (420).

If adaptation is not required or available, or once it is performed, then the mobile exchange infrastructure may determine whether a second service is required to be contacted (422). If so, then the second service is contacted (424). In this case, it should be clear that all of the processes described herein with respect to FIG. 4, as well as other processes not explicitly discussed, may be implemented when contacting the second service. That is, the various functionalities of, for example, translation, adaptation, and emulation, may be used for inter-service requests, as well as for application-service requests.

Once all results are obtained (426), then they may be shared between services as needed, and, particularly, may be shared between all local services (428). In this way, as described above, services have access to information that may later be needed. For example, if the service 104 is a Java-based report generator and the service 106 is a .NET chart maker, results obtained by the report generator 104 may be shared with the chart maker 106, so that the chart maker 106 may be able to create a chart desired by a user, based on the obtained results. It should be understood that this sharing of results may require various ones of the functionalities described above, including, for example, translation between messaging protocols.

Once the results are shared, they may be passed to the originally-requesting application (430). In this way, as already described, the mobile exchange infrastructure 102 mediates all or virtually all communications between applications and services, and ensures that all of these applications and services may interact with one another.

In FIG. 4, it should be understood that the described processes are not intended to be limiting of the ways in which the mobile exchange infrastructure may be implemented. For example, the described processes may be performed in a different order, and some of the processes may be omitted if not required.

Also, although the services of report generator and chart maker have been described, many other services may benefit from use of the mobile exchange infrastructure 102. For example, an enterprise employee may wish to submit a sales order to an enterprise partner, and may use a secure signature service in order to authenticate the submitted order.

As described above, a mobile exchange infrastructure provides for dynamic mediation between services and applications, particularly in a mobile environment. The mobile exchange infrastructure ensures that the services and applications may interact with one another, even when they have been constructed in different development environments, have multiple associated messaging protocols, or are running in different application frameworks. As a result, mobile users may experience increased efficiency and use of available applications and services.

The mobile exchange infrastructure enables dynamic, de-centralized communication between applications and services. Moreover, services and applications may be added to an individual mobile device and be automatically recognized and/or configured for interoperability with existing services and applications. Similarly, a mobile device added to a peer-to-peer network of mobile devices, each including a mobile exchange infrastructure, may have its applications and services automatically and dynamically recognized within the network.

A number of implementations have been described. Nevertheless, it will be understood that various modifications may be made. Accordingly, other implementations are within the scope of the following claims.

What is claimed is:

1. A computer-implemented method comprising:
 receiving, at a mobile exchange infrastructure, a request from an application to invoke functionality provided by a first of two services, the mobile exchange infrastructure and the application being executed on a mobile device;
 translating, using the mobile exchange infrastructure, the request from a messaging protocol of the application to a messaging protocol of the first service;
 determining that the request is incompatible with the first service;
 affecting, in response to determining, the request to provide an affected request; and
 causing the functionality to be invoked using the affected request.

2. The method of claim 1, further comprising:
 passing a result of the invoked functionality to the application.

3. The method of claim 1, wherein:
 the request is incompatible with the first service if the first service is not provided locally, and
 affecting the request further comprises searching a registry for the requested functionality using the request.

4. The method of claim 1, wherein:
 the request is incompatible with the first service if the first service is not running or instantiated, and
 affecting the request further comprises converting a bytecode of the first service.

5. The method of claim 1, wherein translating the message protocol characteristic further comprises translating the request from an eXtensible Mark-up Language (XML) over Hyper-Text Transfer Protocol (HTTP) message protocol to a Simple Object Access Protocol (SOAP) message protocol, or vice versa.

6. The method of claim 1, wherein:
 the request is incompatible with the first service if the first service uses an incompatible service interface, and
 affecting the request further comprises adapting a functional invocation of the request.

7. The method of claim 6, wherein adapting the functional invocation further comprises pointing an invocation from a .NET service to a format used by a Java service, or vice versa.

8. The method of claim 6, wherein adapting the functional invocation further comprises pointing an invocation from a .NET service to a format used by a Web Services Description Language (WDSL) service, or vice versa.

9. The method of claim 1, further comprising:
sharing a result of the invoked functionality with the second service.

10. The method of claim 1, wherein affecting the request further comprises providing a horizontal interface between the two services.

11. The method of claim 1, wherein affecting the request further comprises providing a vertical interface between the first service and a Customer Resource Management (CRM) application.

12. The method of claim 1, wherein the first and second services are deployed on the mobile device.

13. A computer program product, tangibly embodied on a non-transitory machine-readable medium, the computer program product comprising instructions that, when read by a machine, operate to cause data processing apparatus to:
receive, at a mobile exchange infrastructure, a request from an application to invoke functionality provided by a first of two services, the mobile exchange infrastructure and the application being executed on a mobile device;
translate, using the mobile exchange infrastructure, the request from a messaging protocol of the application to a messaging protocol of the first service;
determine that the request is incompatible with the first service;
affect, in response to determining, the request to provide an affected request; and
cause the functionality to be invoked using the affected request.

14. The computer program product of claim 13, wherein:
the request is incompatible with the first service if the first service is not provided locally, and
affecting the request further comprises searching a registry for the requested functionality using the request.

15. The computer program product of claim 13, wherein:
the request is incompatible with the first service if the first service is not running or instantiated, and
affecting the accessed request further comprises converting a bytecode of the first service.

16. The computer program product of claim 13, wherein:
the request is incompatible with the first service if the first service uses an incompatible service interface, and
affecting the request further comprises adapting a functional invocation of the request.

17. A device comprising:
a storage medium storing first and second services; and
a processor configured to:
receive, at a mobile exchange infrastructure, a request from an application to invoke functionality provided by the first service, the mobile exchange infrastructure and the application being executed on the device,
translate, using the mobile exchange infrastructure, the request from a messaging protocol of the application to a messaging protocol of the first service;
determine that the request is incompatible with the first service;
affect, in response to determining, the request to provide an affected request, and
cause the functionality to be invoked using the affected request.

18. The device of claim 17, wherein the processor and storage medium comprise a mobile platform.

* * * * *